UNITED STATES PATENT OFFICE.

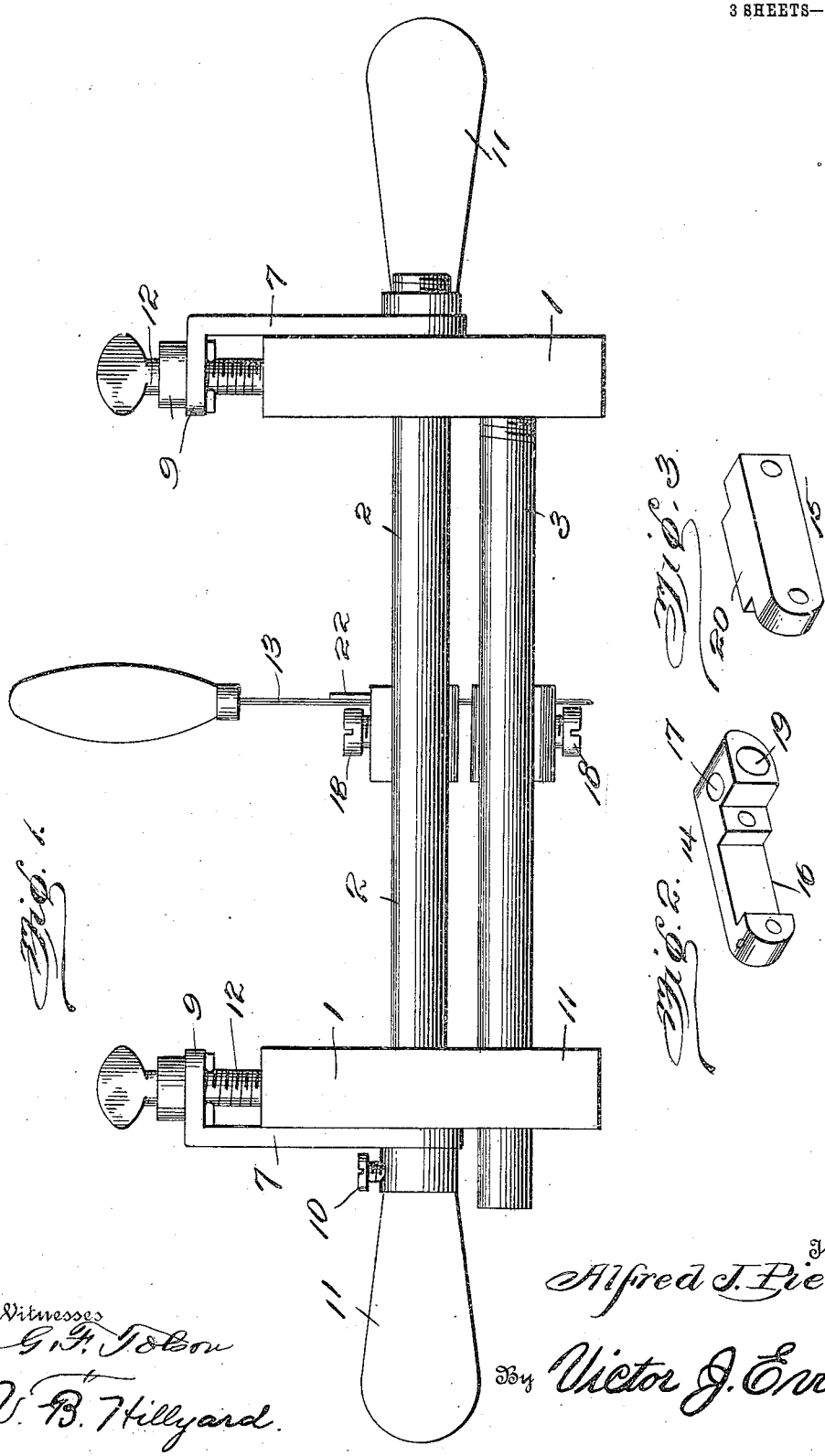

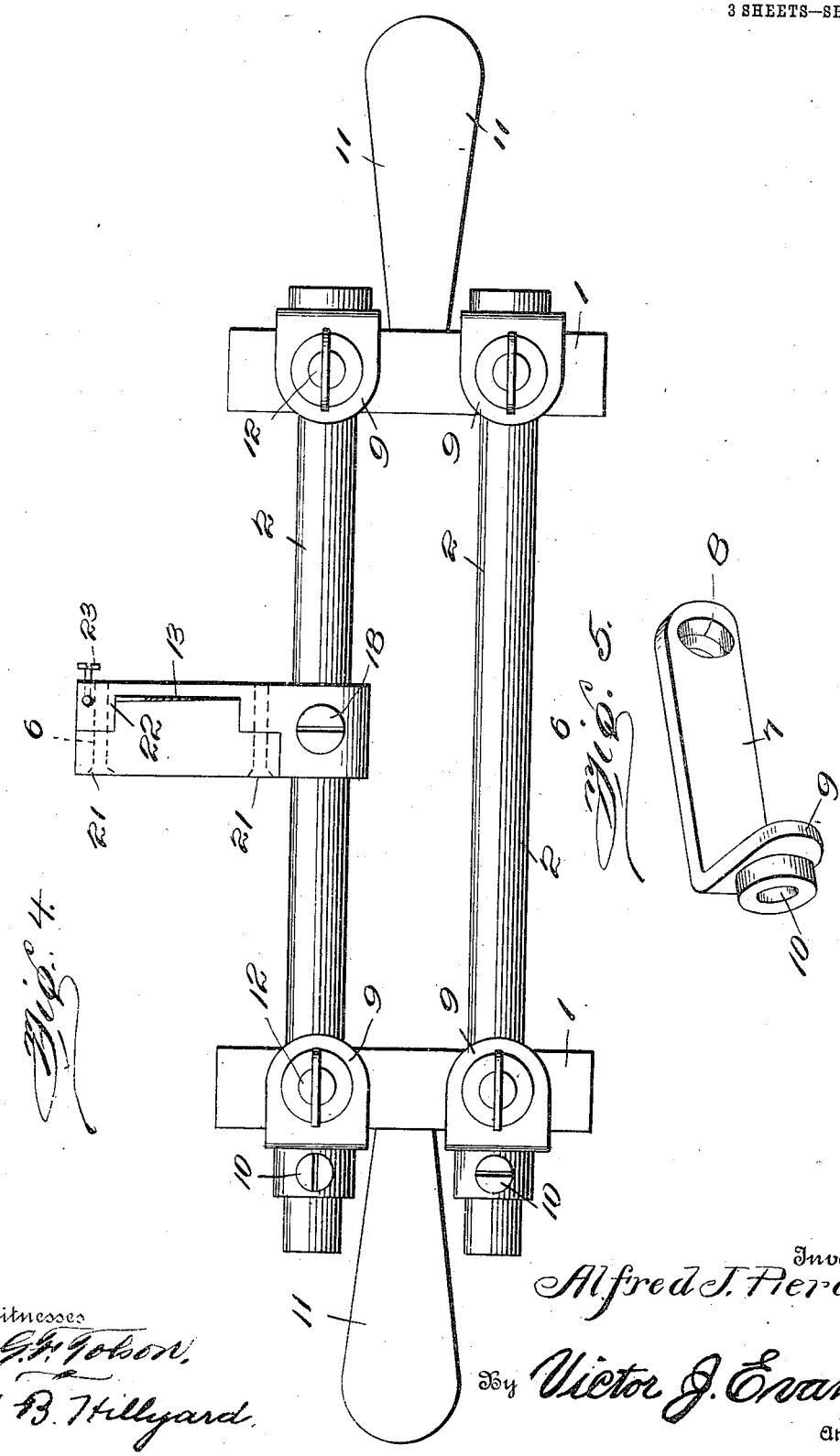

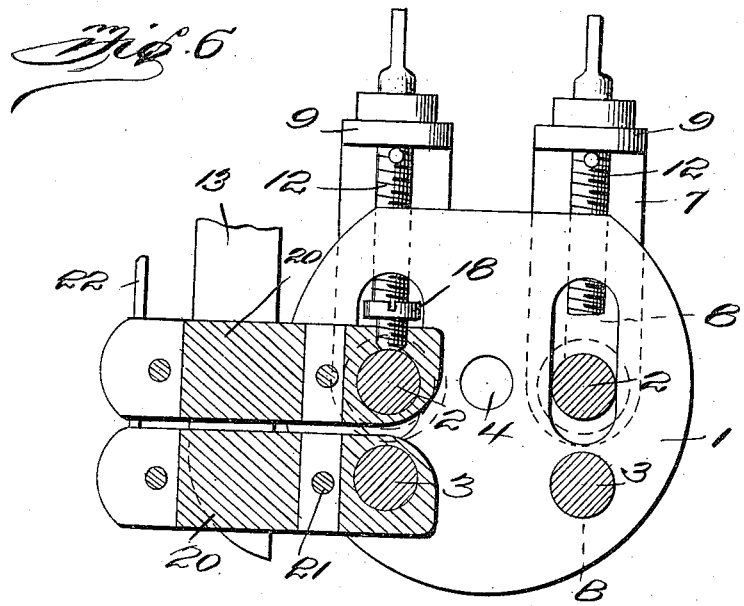
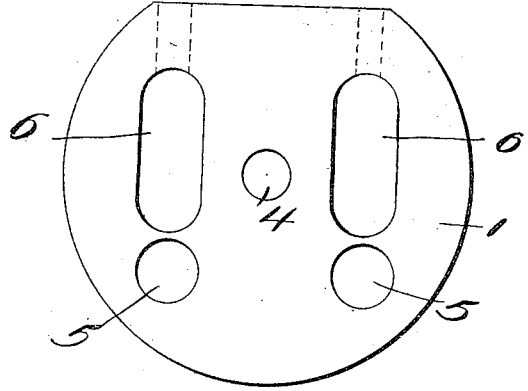
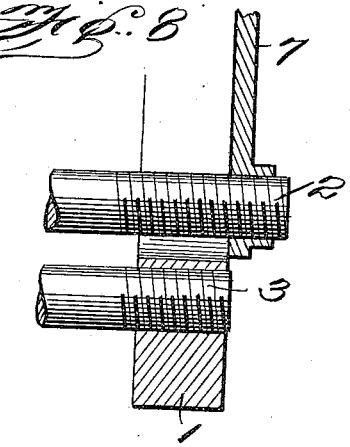

ALFRED J. PIERCE, OF CONSHOHOCKEN, PENNSYLVANIA.

STRIP-CUTTER.

961,643.

Specification of Letters Patent. Patented June 14, 1910.

Application filed August 10, 1909. Serial No. 512,267.

*To all whom it may concern:*

Be it known that I, ALFRED J. PIERCE, a citizen of the United States, residing at Conshohocken, in the county of Montgomery and State of Pennsylvania, have invented new and useful Improvements in Strip-Cutters, of which the following is a specification.

The present invention appertains to means whereby sheet material such as leather, raw hide, and the like of any thickness may be cut into strips of uniform width for any desired purpose.

The invention has for its object to provide a machine, which may be readily adapted to material of different thicknesses and which may be easily adjusted to cut said material into strips of determinate width, the several parts being so arranged and constructed as to admit of their instant adjustment or ready separation for any desired purpose and according to existing conditions.

The invention consists of the novel features, details of construction, and combinations of parts, which hereinafter will be more particularly set forth, illustrated and finally set forth in the subjoined claims.

Referring to the drawings, forming a part of the specification, Figure 1 is a front view of a cutting machine embodying the invention. Fig. 2 is a perspective view of one member of the holder for the cutting blade. Fig. 3 is a perspective view of the other member of the holder for the cutting blade. Fig. 4 is a top plan view of the cutting machine. Fig. 5 is a perspective view of a bracket forming a mount for an adjustable rod or bar. Fig. 6 is a transverse section on the line 6—6 of Fig. 4. Fig. 7 is a view in elevation of one of the end-pieces. Fig. 8 is a detail sectional view on the line 8—8 of Fig. 6.

Corresponding and like parts are referred to in the following description, and indicated in all the views of the drawings, by the same reference characters.

The cutting machine comprises like end-pieces 1 and pairs of rods or bars 2 and 3. Each end-piece 1 is provided with a central opening 4, a pair of openings 5 near the lower edge, and a pair of slots 6 extending in parallel relation and in line with the openings 5. The end-pieces 1 may be of any construction and are preferably of approximately circular outline with their upper edges flattened. The lower rods or bars 3 are connected at one end with one end of the end-pieces in any substantial way and have loose connection with the opposite end-piece. The upper rods or bars 2 pass through the slots 6 and are adapted to move therein toward and from the rods or bars 3, so as to vary the space between the two sets of rods or bars according to the thickness of the sheet material to be cut up into strips. The lower rods 3 are threaded at one end into the openings 5 of one end-piece and pass loosely through the openings 5 of the other end-piece. Brackets 7 are provided for opposite ends of each of the rods or bars 2 and each bracket is provided at one end with an opening 8 and has its opposite end portion bent at a right angle, as indicated at 9, and formed with an opening 10. The openings 8 and 10 are reinforced upon their outer sides by bosses in order to provide extended bearings. The upper rods or bars 2 are arranged to operate in the slots 6 of the end-pieces and are supported in the openings 8 of the brackets or mounts 7. One end of each of the rods or bars 2 is threaded into a bracket 7, as indicated in Fig. 8, and the opposite end passes loosely through the opening 8 of the opposite bracket, thereby admitting of the adjacent end-piece 1 and brackets sliding upon the rods or bars 2 when moving the end-pieces to vary the distance between them according to the width of the sheet material to be cut into strips. One of the end-pieces is relatively fixed, whereas the opposite end-piece and brackets or mounts 7 are adjustable upon the opposite end portions of the rods or bars 2 and 3. Set screws 10 threaded into the bosses extended outward from the adjustable brackets 7 secure the latter upon the rods or bars 2 in the desired adjusted position. Each end-piece is provided with a handle 11, which is threaded or otherwise secured in the central opening 4 of the end-piece.

The upper rods or bars 2 are adjustable toward and from the relatively lower rods or bars 3. This adjustment is effected by means of set screws 12, which are mounted in the bent ends 9 of the brackets or mounts 7 and have screw thread connection with the end-pieces. The upper ends of the set screws 12 are connected by a swivel joint with the bent ends 9, so as to turn freely therein. Upon turning the set screws 12 the brackets or mounts 7 are moved with reference to the end-pieces 1 and effect a corresponding movement of the rods or bars 2, thereby admitting of the distance between the upper and lower rods being varied to suit the thickness of the material passing between the said rods.

Any style or type of cutter 13 may be provided for cutting the material into strips. The cutter shown consists of a knife blade and is secured to upper and lower holders, of light formation, each mounted upon a rod or bar 2 and 3, as indicated most clearly in Fig. 6. Each of the holders consists of complemental members 14 and 15. The member 14 has a recess 16 forming a seat to receive the cutting blade 13. One end of the member 14 is provided with a threaded opening 17 to receive a set screw 18 and with an opening 19 intersecting the opening 17 and extending at right angles thereto so as to receive the rod or bar 2 or 3 upon which the holder is mounted, the set screw 18 serving to secure the holder upon the rod in the located position. The member 15 has a projecting portion 20 to enter the recess 16 of the member 14 and clamp the cutting blade 13, as indicated most clearly in Fig. 4. The members 14 and 15 are formed with transverse openings, through which pass machine screws or fastenings 21, by means of which the members are drawn together so as to clamp the cutting blade between them. The upper and lower holders are separable with the bars 2 and 3 upon which they are mounted. A guide 22 serves to retain the outer or rear ends of the holders for the cutting blade in proper position. This guide consists of a rod, which, as shown, is secured in a vertical opening formed in one of the holders and passes loosely through an opening formed in the other holder. A set screw 23 threaded into an opening of one of the holders secures the guide thereto.

While the machine is specially designed for cutting leather or raw hide into strips of uniform width, it is manifest that it may be advantageously employed for cutting sheet material of any nature into strips capable of being cut by a knife blade. The rods or bars 2 and 3 may be of any length and by adjusting the distance between the end-pieces 1 the machine may be readily adapted to the width of the material to be cut. It is to be understood that the construction is such as to admit of the rods or bars 2 and 3 being readily replaced by like parts of different lengths according to the width of the material to be cut into strips. After the end-pieces have been adjusted to the width of the material the distance between the upper and lower rods 2 and 3 may be adjusted by operating the set screws 12, such adjustment serving at the same time to regulate the distance between the holders receiving the cutting blade. The width of the strip to be cut is regulated by moving the cutting blade 13 to the required distance from one of the end-pieces, the holders being secured in the adjusted position by retightening the set screws 18, which were previously loosened preliminary to adjusting the cutter. The piece of leather or other material to be cut into strips is secured at one end in any manner, the machine having previously been fitted to the end to be made fast, so as to leave a portion projecting in the rear thereof to be secured. After the machine has been adjusted to the material and the latter secured in the manner stated the handles 11 are grasped and the machine drawn along the material with the result that the cutting blade 13 severs the strip therefrom. The distance between the upper and lower rods or bars 2 and 3 having been adjusted to the thickness of the material it follows that said material is prevented from bucking, hence the strip cut is of uniform width throughout its length.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

I claim:—

1. A cutting machine for severing sheet material into strips of required width, the same comprising end-pieces, a pair of rods or bars supported in the end-pieces, means for varying the distance between said rods and to suit the thickness of the material to be cut up into strips, means for securing the end-pieces upon the rods in an adjusted position, and a cutter mounted upon said rods and adapted to be secured thereon in the required position according to the width of the strips to be cut.

2. A cutting machine for severing sheet material into strips of desired width, the same comprising a pair of rods or bars, end-pieces mounted upon said rods and adjustable thereon, means for varying the distance between said rods according to the thickness of the material to be cut into strips, a cutting blade, and holders for the cutting blade each mounted upon a rod and adjustable therewith and in turn adjustable upon the rods to admit of adapting the machine for cutting the material into strips of desired width.

3. In a cutting machine of the character described the combination of spaced rods or bars, end-pieces mounted thereon, means for varying the space between said rods, a cutting blade, like holders mounted upon the rods, each adapted to secure said cutting blade and both holders movable with the rods when adjusting the distance between them, means for securing the holders upon the respective rods in the desired adjusted position, and a guide located at the outer ends of the holders to maintain the same in given position.

4. In a cutting machine for severing sheet material into strips, the combination of a pair of rods, end-pieces mounted upon the rods and adjustable thereon, means for securing the end-pieces in the required adjusted position, means for varying the distance between the rods, a cutting blade, like holders for the cutting blade adjustably mounted upon said rods, means for securing the holders upon the respective rods in the desired adjusted position, and a guide for holding the outer ends of said holders in given position.

5. A machine of the character described comprising end-pieces provided with corresponding slots, a rod supported in the end-pieces, a coöperating rod arranged in the slots of said end-pieces and adjustable therein toward and from the first mentioned rod, mounts for the adjustable rod, and means for connecting said mounts to the end-pieces and adjusting the same to vary the distance between the two rods.

6. A cutting machine of the character described comprising like end-pieces each having an opening and a slot, a rod supported in the openings of the end-pieces, a coöperating rod mounted in the slots of the end-pieces, mounts receiving and supporting the adjustable rod, and set screws connecting the mounts with the end-pieces and serving to adjust said mounts to vary the distance between the rods.

7. In combination end pieces having openings and slots, a rod secured at one end in the opening of an end-piece and loose in the opening of the other end-piece, a second rod mounted in the slots of the end-pieces, brackets receiving the adjustable rod and supporting the same, one of the brackets being fast to the rod and the other bracket loose upon said rod, set screws adjustably connecting the brackets to the respective end-pieces, and a set screw for securing the loose mount upon the rod passing therethrough and serving to fix the distance apart of the two end-pieces upon the said rods.

8. The herein described machine for cutting sheet material into strips, the same comprising end-pieces provided with handles and having corresponding pairs of openings and slots, rods supported in the openings of the end-pieces and secured at one end to one of the end pieces and loose in the other end-piece, other rods arranged in the slots of the end-pieces, brackets receiving the adjustable rods, a set of brackets having the adjustable rods fast thereto and the other set of brackets having the adjustable rods loose therein, set screws for securing the brackets to the end-pieces in the desired adjusted position and serving to space the rods apart to the required extent, set screws for securing the adjustable brackets to the rods passing loosely therethrough and serving to fix the distance apart of the end-pieces upon the rods, a cutting blade, and holders therefor mounted upon a set of rods and relatively adjusted therewith to vary the distance between them according to the thickness of the material to be cut.

In testimony whereof I affix my signature in presence of two witnesses.

ALFRED J. PIERCE.

Witnesses:
WM. F. SMITH,
JAMES J. WILFONG.